UNITED STATES PATENT OFFICE.

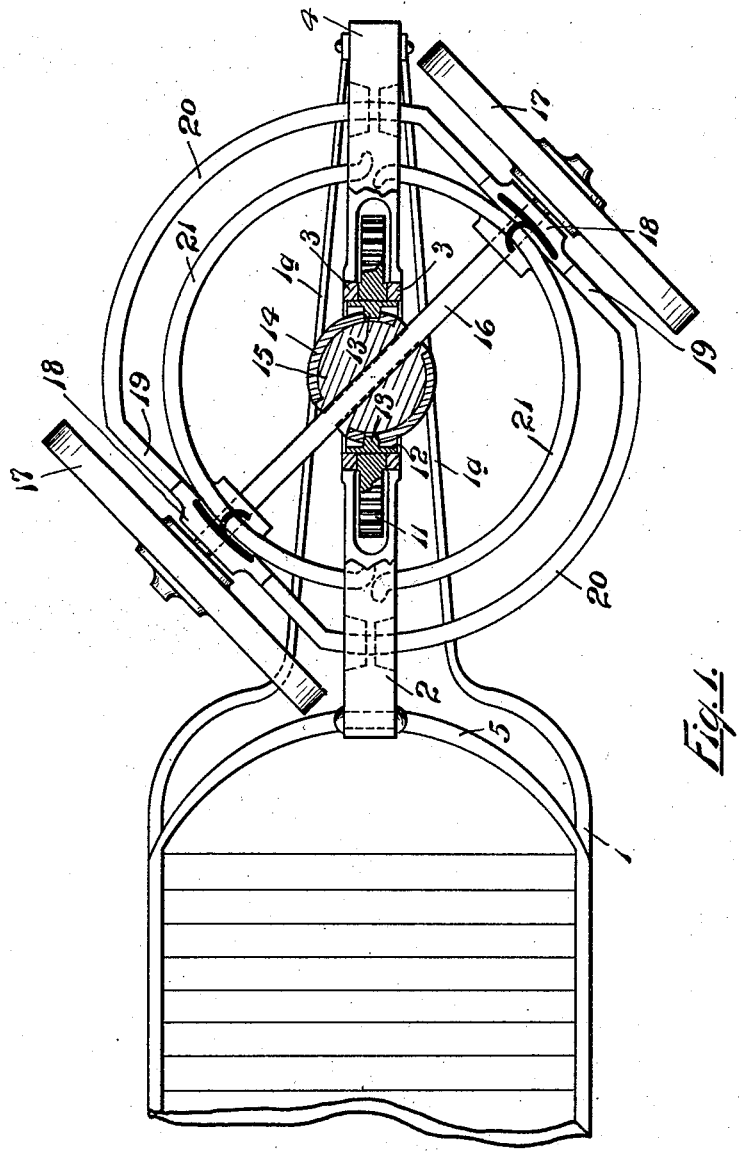

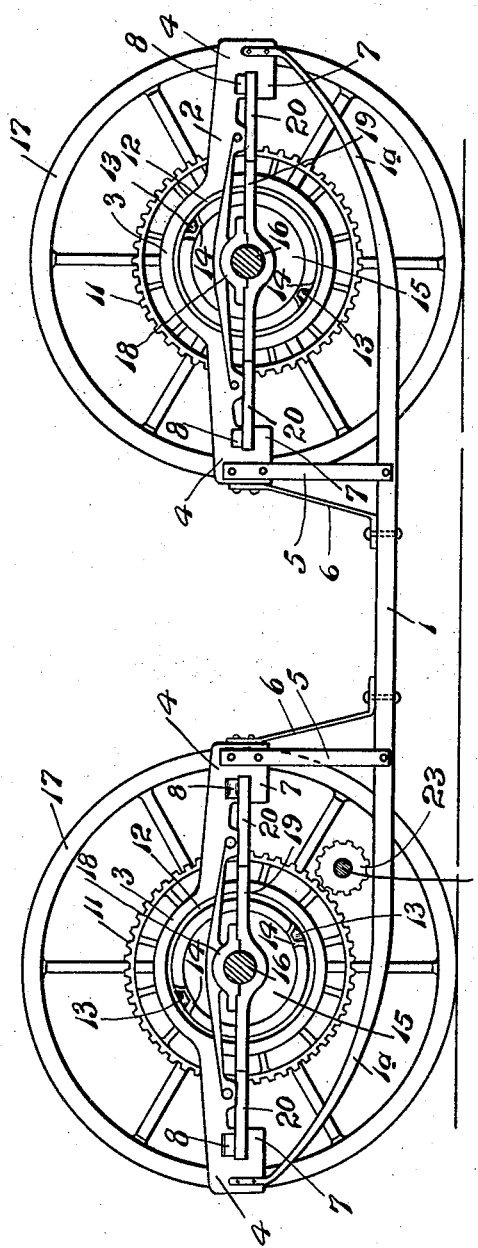

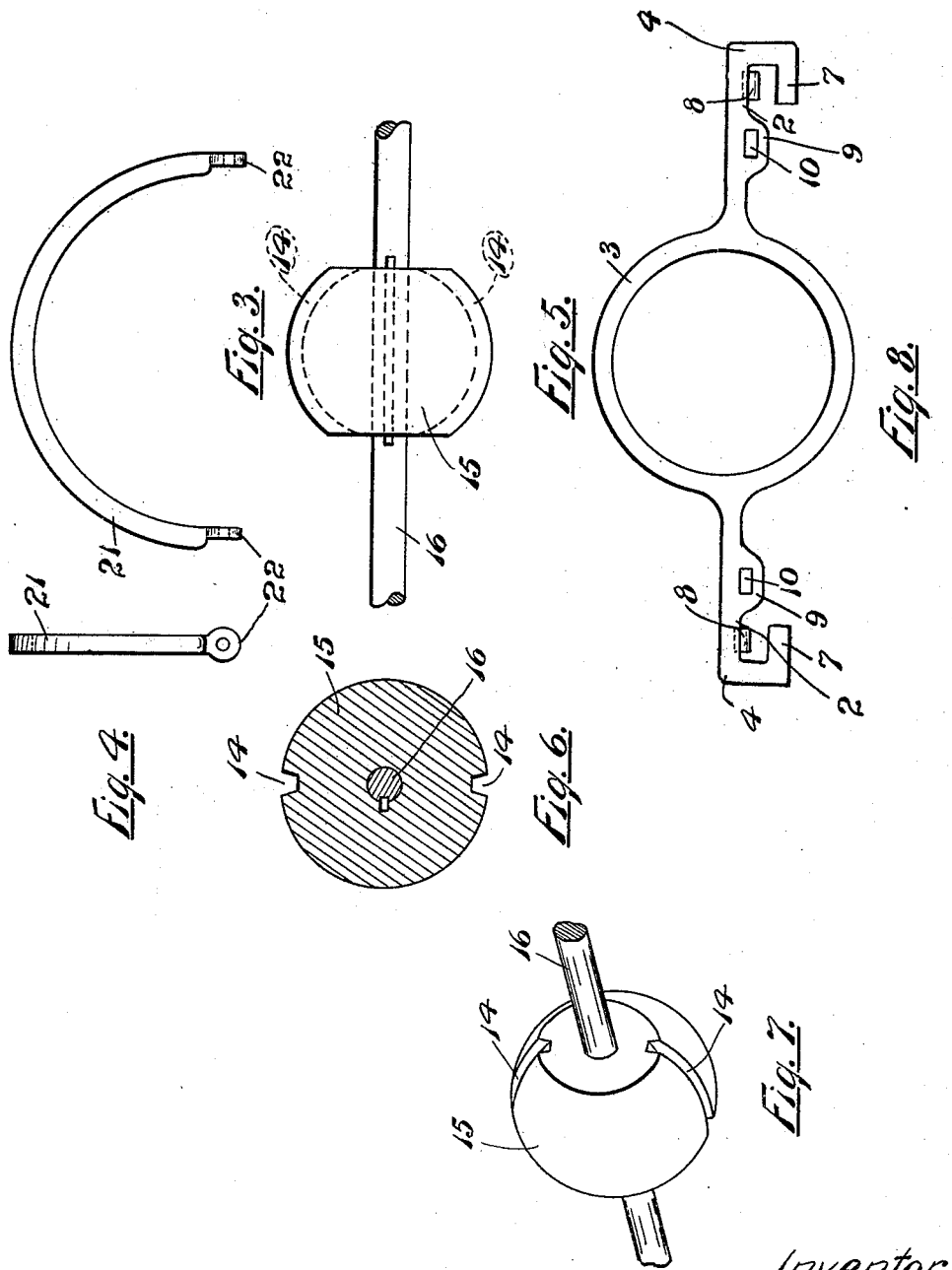

HENRY L. CRAVEN, OF DELTON, MICHIGAN.

DRIVE FOR TRUCKS AND THE LIKE.

1,399,933.  Specification of Letters Patent.  Patented Dec. 13, 1921.

Application filed November 17, 1919. Serial No. 338,606.

*To all whom it may concern:*

Be it known that I, HENRY L. CRAVEN, a citizen of the United States of America, residing at Delton, in the county of Barry and State of Michigan, have invented certain new and useful Improvements in Drives for Trucks and the like; and I do hereby declare the following to be a full, clear, and exact description of the invention, such as will enable others skilled in the art to which it appertains to make and use the same.

This invention relates to a truck or tractor and is particularly concerned with a novel means of driving both the front and rear axles of the same, mechanism being employed to permit a change of direction of the truck or tractor during the time that the driving is taking place. The invention consists of many novel details of construction and arrangement of parts for producing a truck or tractor by which the ends stated may be attained.

For an understanding of the invention, reference may be had to the following description taken in connection with the accompanying drawings, in which:

Figure 1 is a plan view with parts broken away and shown in section of one end of the tractor or truck.
Fig. 2 is a side elevation thereof, the axles at one side being removed and the wheels being shown in section.

Figs. 3 and 4 are, respectively, a plan view and a side view of one of the elements used in the construction.

Fig. 5 is an elevation of the axle driving member.

Fig. 6 is a transverse section therethrough.

Fig. 7 is a perspective view of the same, and

Fig. 8 is a side elevation of the bar one of which is used with each end of the truck or tractor for mounting the axles and the driving mechanisms.
Like reference characters refer to like parts in the different views of the drawings.

In the construction, a body is provided between the front and rear axles of the truck or tractor having side frame members 1 which, at each end, are turned inwardly toward each other and then further extended as indicated at 1ª. A bar 2 of the type shown in Fig. 8 is located at each end of the body, said bar at its middle being provided with an open circular ring 3. The ends of the sections 1ª of the frame members 1 are attached to the outer ends 4 of the bars 2. The inner ends of said bars are held in upper position so as to keep the bars substantially horizontal by means of suitable brace and connecting members 5 and 6 which are attached at their upper ends to the inner ends 4 of the bars 2 and at their lower ends to suitable parts of the body as shown in Fig. 2. Each end 4 of the bar 2 is turned back underneath to provide a lip 7 above which a roller 8 is mounted. Between each of the ends 4 of the bar and the central ring 3 a projection 9 is formed having a transverse opening 10 therethrough as shown.

The bar is slotted at its central portion so that a gear 11 may pass therethrough. A ring band 12 is passed through the gear and suitably connected thereto, it being of a size to fit within the ring 3 as best shown in Fig. 1. Studs 13 project from this band at opposite sides thereof and are received in grooves 14 cut in opposite sides of a spherical driving member 15 keyed on the shaft 16 midway between its ends. One of these shafts is used at each end of the truck or tractor and wheels 17 are mounted at the ends thereof as shown.

Each shaft 16 near its ends is mounted in a bearing 18 on side bars 19 which are connected by integral curved sections 20, the same passing between lips 7 and the rollers 8 so that a turning of the shaft member 15, wheels 17 and the attached bars 19 and 20 about the vertical axis of the sphere 15 may be accomplished. A ring comprised of two sections 21 attached at their ends to the bar 4, and passing at their ends into the openings 10, is disposed so as to contact at its sides with the parts 19, this giving greater strength and precluding any endwise movement of the shaft 16 and attached parts. Each end of the section 21 is flattened as indicated at 22 so as to overlap with the similar ends 22 of the other section when inserted in the openings at 10. Various other ways of securing sections 21 in place may be used. To drive the gear 11 a pinion 23 meshes therewith being mounted on a shaft 24 which in turn may be driven in any suitable manner as by an engine carried on the body of the truck or tractor.

With this construction each end of the truck or tractor may be driven and at the same time the shaft 16 may be turned at an angle to the length of the body, the grooves 14 in the spherical driving member 15 permitting this movement. The truck or tractor is of the same construction at each end and either end may be considered the forward end thereof. The structure is relatively simple, contains comparatively few parts and may be manufactured at comparatively low cost.

I claim:

1. In a device of the character described, a body, bars connected to each end of the body and extending horizontally toward each other, each of said bars being formed with a central ring and slotted lengthwise at the central portion thereof, a ring band mounted within the ring, a gear attached to said band, projections extending inwardly from opposite sides of the band, a spherical driving member located within the band and provided with grooves in opposite sides into which the projections extend, an axle passing through the driving member, wheels mounted at the ends of the axle, and means for mounting the axle on the body and permitting the same to turn to different angles with respect to the body, substantially as and for the purposes described.

2. In combination, an elongated body, a bar located horizontally above and at each end of the body and connected thereto at its ends, said bar at each end and under the same being provided with a lip, said lips on each bar extending toward each other and spaced a distance from the main portion of the bar, curved members connected at their ends by straight bars mounted on each of said first mentioned bars and passing between the ends of the bar and said lips, a shaft extending across and between said straight bars and mounted in bearings thereon, a ring attached to each of said first bars and lying between said straight bars, and means for driving each shaft at the center thereof, substantially as described.

3. In combination, an elongated body, a horizontal bar provided at its middle with an open ring portion secured at each end of the body, each of said horizontal bars being slotted lengthwise at its middle part, a ring band disposed within each of the rings of said horizontal bars, a gear attached to each ring band, a projection on each ring band extending inwardly therefrom, a spherical member having a groove cut in a side thereof into which said projection extends, a shaft passing through the said spherical member and keyed thereon, means for driving the gear, wheels on the end of the shaft, means for mounting the shaft on the body, said means permitting the shaft to be turned to different angles with respect to the length of the body, and means for holding the shaft against longitudinal movement with respect to its associated bar, substantially as described.

4. A construction containing the elements in combination claimed in claim 3 combined with rollers located above said curved bars and between the same and the first mentioned bar at the ends thereof, substantially as described.

In testimony whereof I affix my signature.

HENRY L. CRAVEN.